United States Patent
Cui et al.

(10) Patent No.: US 8,801,810 B1
(45) Date of Patent: Aug. 12, 2014

(54) CONDUCTING FORMATION CYCLES

(75) Inventors: Yi Cui, Stanford, CA (US); Eugene M. Berdichevsky, Menlo Park, CA (US); Graeme R. Hoste, Menlo Park, CA (US); Rainer J. Fasching, Mill Valley, CA (US); Song Han, Foster City, CA (US); Mark C. Platshon, Menlo Park, CA (US)

(73) Assignee: Amprius, Inc., Sunnyvale, CA (US)

( * ) Notice: Subject to any disclaimer, the term of this patent is extended or adjusted under 35 U.S.C. 154(b) by 884 days.

(21) Appl. No.: 12/944,572

(22) Filed: Nov. 11, 2010

Related U.S. Application Data

(60) Provisional application No. 61/260,298, filed on Nov. 11, 2009.

(51) Int. Cl.
 *H01M 10/058* (2010.01)
 *H01M 10/44* (2006.01)

(52) U.S. Cl.
 USPC .............. 29/623.1; 429/50; 429/52; 320/128; 320/130

(58) Field of Classification Search
 USPC ............................ 429/50, 52; 320/128, 130
 See application file for complete search history.

(56) References Cited

U.S. PATENT DOCUMENTS

| | | | |
|---|---|---|---|
| 7,816,031 B2 | 10/2010 | Cui et al. | |
| 2007/0190418 A1* | 8/2007 | Chiang et al. | 429/50 X |
| 2009/0169996 A1 | 7/2009 | Zhamu et al. | |

FOREIGN PATENT DOCUMENTS

WO 2010/014387 2/2010

OTHER PUBLICATIONS

U.S. Application entitled "Electrode Including Nanostructures for Rechargeable Cells", U.S. Appl. No. 12/437,529, filed May 7, 2009.
Kasavajjula, et al. Nano-and bulk-silicon-based insertion anodes for lithium-ion secondary cells. J. Power Sources 163, 1003-1039 (2007).
U.S. Appl. No. 13/281,252, "Forming Multilayered Solid Electrolyte Interphase Structures on High Capacity Electrodes," Fasching et al., filed Oct. 25, 2011.
Choi et al., "Surface layer formed on silicon thin-film electrode in lithium bix(oxalato) borate-based electrolyte," Journal of Power Sources 172 (2007) 404-409, Apr. 30, 2007.
Xu, Kang, "Nonaqueous liquid electrolytes for lithium-based rechargeable batteries," Chem. Rev. 2004, 104, 4303-4417, Nov. 3, 2003.
Xu et al., "Composite silicon nanowire anodes for secondary lithium-ion cells," Journal of the Electrochemical Society, 157, (1) A41-A45 (2010), Nov. 10, 2009.
Xu et al., "LiBOB: is it an alternative salt for lithium ion chemistry?" Journal of Power Sources 146 (2005) 79-85, May 31, 2005.
Marczak et al., "The individual core/shell silicon nanowire structure probed by Raman spectroscopy," Phys. Status Solidi C 6, No. 9, 2053-2055 (2009).

* cited by examiner

*Primary Examiner* — Barbara Gilliam
*Assistant Examiner* — Stephan Essex
(74) *Attorney, Agent, or Firm* — Weaver Austin Villeneuve & Sampson LLP

(57) ABSTRACT

Provided are methods of preparing a lithium ion cell including forming the cell by charging the lithium ion cell to at least about 5% or, more specifically, to at least about 20% of the theoretical capacity of the negative electrode electrochemically active material, holding the lithium ion cell in a charged state for at least about 0.5 hours, and discharging the lithium ion cell. Holding the lithium ion cell in a partially charged state is believed to significantly improve its Coulombic efficiency during subsequent cycling.

16 Claims, 11 Drawing Sheets

↑ Discharge    ↓ Charge

CONDUCTING FORMATION CYCLES

CROSS-REFERENCE TO RELATED APPLICATIONS

This application claims the benefit of U.S. Provisional Application No. 61/260,298, filed Nov. 11, 2009, entitled "Conducting Formation Cycles," which is incorporated herein by reference in its entirety for all purposes.

BACKGROUND

The demand for high capacity rechargeable batteries is strong. Many applications, such as aerospace, medical devices, portable electronics, and automotive, require high gravimetric and/or volumetric capacity cells. Lithium ion technology demonstrated significant promises in this regard. However, the lithium ion technology is primarily based on graphite negative electrodes, and graphite has theoretical capacity of only about 372 mAh/g during lithiation.

Silicon is an attractive insertion material for lithium and other electrochemically active ions. A theoretical capacity of silicon in lithium ion cell has been estimated at about 4200 mAh/g during lithiation. Yet silicon and some other high capacity electrode materials have not been widely used or commercially implemented. One of the main reasons is substantial changes in volume during cycling. For example, silicon swells as much as 400% when it is charge close to its theoretical capacity. Volume changes of this magnitude can cause substantial stresses in active material structures resulting in fractures and pulverization, loss of electrical connections within the electrode, and capacity fading of the battery. Overall, there is a need for improved application of high capacity active materials in battery electrodes that minimize the drawbacks described above.

SUMMARY

Provided are methods of preparing a lithium ion cell including forming the cell by charging the lithium ion cell to at least about 5% or, more specifically, to at least about 20% of the theoretical capacity of the negative electrode electrochemically active material, holding the lithium ion cell in a charged state for at least about 0.5 hours, and discharging the lithium ion cell. Holding the lithium ion cell in a partially charged state is believed to significantly improve its Coulombic efficiency during subsequent cycling.

In certain embodiments, a method of preparing a lithium ion cell involves receiving a negative electrode comprising silicon as a negative electrode electrochemically active material for releasing lithium ions during discharge of the lithium ion cell and receiving a positive electrode containing a positive electrode electrochemically active material for taking up lithium ions during discharge of the lithium ion cell. The method also involves receiving a separator for electronically isolating the negative electrode and the positive electrode in the lithium ion cell and preparing the lithium ion cell by arranging the positive electrode, the negative electrode, and the separator together with an electrolyte for transporting lithium ions between the positive electrode and the negative electrode during cycling of the lithium ion cell. The method then proceeds with forming the lithium ion cell by charging it to at least about 20% of the theoretical capacity of the negative electrode electrochemically active material and holding the lithium ion cell in a charged state for at least about 0.5 hours. Holding the lithium ion cell in the charged state in provides improved Coulombic efficiency in one or more subsequent cycles. Finally, the cell may be discharged.

In certain embodiments, a negative electrode electrochemically active material also includes at least one or more of the following materials germanium, carbon, and tin. In the same or other embodiments, a negative electrode electrochemically active material is preloaded with lithium. For example, an auxiliary electrode may be used to transfer additional lithium to the negative electrode during formation or some later cycling. The preloaded negative electrode electrochemically active material may represent at least about 5% of the theoretical capacity the negative electrode electrochemically active material.

In certain embodiments, charging a lithium ion cell during a formation cycle involves passing an electrical current at a rate of between about C/10 to about C/40. In the same or other embodiments, the charging may proceed to between about 20% and about 100% of the theoretical capacity of the negative electrode electrochemically active material. In certain embodiments, holding the lithium ion cell in a charge state extends for at least about 1 hour. In more specific embodiments, holding a cell in the charged state proceeds for between about 1 and 72 hours. In some embodiments, holding the lithium ion cell in a charge state involves discharging said cell at a rate of no greater than about C/50. The cell may remain partially charge at the end of this operation. A first formation cycle may have a Coulombic efficiency of at least about 70% or, more specifically, of at least about 80%. In certain embodiments, a cell is discharged, during the formation cycle, to a state to the silicon capacity of at least about 3,000 mAh/g.

In certain embodiments, a discharge capacity of lithium ion cell after 10 cycles measured at a rate of about C/2 is at least about 50% of the theoretical capacity of the negative electrode electrochemically active material. In the same or other embodiments, a lithium ion cell exhibits a Coulombic efficiency of at least than about 95% during a first charge-discharge cycle after formation. In certain embodiments, a negative electrochemically active material includes a nanostructured silicon material, such as substrate rooted silicon nanowires. Provided also a lithium ion cell prepared in accordance with any of the foregoing techniques.

These and other aspects of the invention are described further below with reference to the figures.

DETAILED DESCRIPTION

Figure 1:
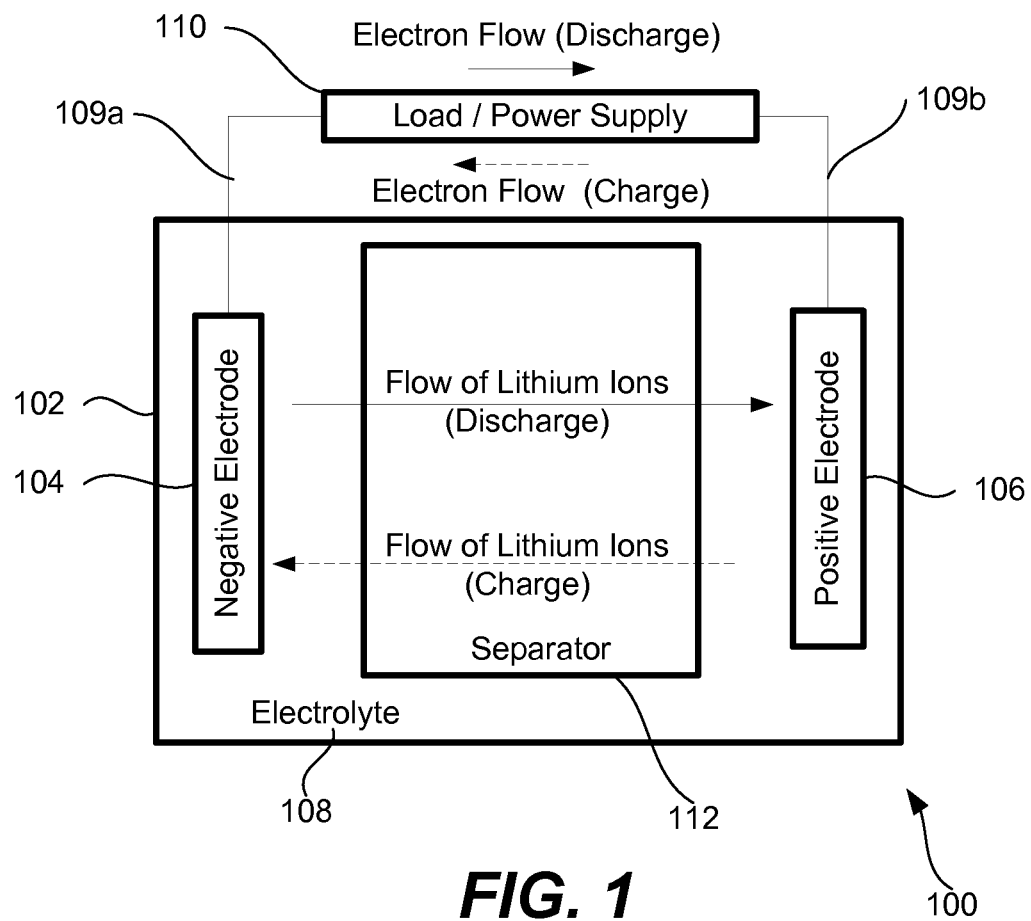
FIG. 1 is a schematic representation of lithium ion cells in accordance with certain embodiments.

Lithium ion cells are typically fabricated in a discharged state, such that most or all lithium available for electrochemical transfer between electrodes state is present on a positive electrode. The initial charging and, in certain embodiments, initial discharging may cause irreversible transformations within a cell and is therefore generally performed in a controlled manner. Such initial cycling of a cell is referred to as "formation" and may involve one or more cycles. It is typically performed after a cell is assembled and, in certain embodiments, before the cell is sealed.

In lithium ion cells, formation involves one or more initial cycles during which some lithium ions are irreversibly driven from an active material on the positive electrode and transferred to the active material of the negative electrode. This process is sometimes referred to as lithiation of the negative electrode or, simply, negative electrode lithiation. During initial negative electrode lithiation, some lithium ions are believed to form a modified surface layer on the electrode surface. This surface layer is known as a solid electrolyte interphase (SEI) layer and is believed to be composed of reaction products, such as $Li_2CO_3$ and LiF in graphite negative electrodes that result from reduction of the electrolyte and lithium on the negative electrode active material surface. Effects of SEI layer formation are greater for electrodes with high surface areas or, more specifically, for electrodes that have large ratios of exposed surface area to volume of the negative electrode active material such as encountered with nanostructured negative electrode materials (e.g., substrate rooted nanowires). While such (large surface area) electrodes may be attractive from ionic conductivity and other perspectives, substantial amounts of lithium, electrolyte, and negative electrode active materials may be consumed during SEI formation and become unavailable in future cycles degrading performance of the cell. Therefore, it may be particularly important to control SEI formation during formation cycling in electrochemical cells containing such electrodes.

With some negative electrode active materials, such as silicon, the negative electrode may irreversibly hold significant amounts of lithium, beyond what is necessary to form an SEI layer, due various mechanisms, such as possibly metallurgical transformations, silicon pulverization, loss of electrical connection, etc., which are generally not well understood. For example, it is not uncommon to observe cells with silicon-based negative electrodes that lose as much as 20-40% of its first cycle capacity in subsequent cycles resulting in a poor cycle life. Without being restricted to any particular theory, it is believed that allowing rest periods during formation cycling (e.g., resting cells in a charged state) may reduce irreversible capacity losses from SEI layer formation and improve stress relaxation.

It has been unexpectedly found that the cycle life of a lithium ion cell containing a negative electrode with silicon nanostructures (e.g., substrate rooted nanowires) can be substantially improved by holding the cell in a charged state for an extended pre-determined period of time after the initial charge before proceeding to the discharge. For example, a cell may be charged to near the maximum theoretical capacity of silicon, which is approximately 4,200 mAh/g, and then kept for a period of time, e.g., 48 hours, before being discharged. Forming a cell using processes described herein demonstrated substantial performance advantage.

Such formation processes may be applied to any lithium ion cell design, but they find particular benefit when used with cells having high capacity and/or large volume change negative electrode active materials. Examples of such materials include silicon, germanium, tin, tin oxide, titanium oxide, a variety of metal hydrides (e.g., $MgH_2$), silicides, phosphides, and nitrides, and mixtures of materials with carbon, copper, and/or nickel. In certain embodiments, the negative active material is a nano-structured material, such as a collection of nanowires.

A lithium ion battery includes one or more lithium ion electrochemical cells, each containing electrochemically active materials. In addition to its cell(s), a lithium ion battery may also include a power management circuit to control its power balancing and various characteristics of charging-discharging. Batteries containing more than one cell are sometimes referred to as battery packs.

FIG. 1 is a simplified schematic depiction of a typical lithium ion cell 100 including a negative electrode (negative electrode) 104, a positive electrode (positive electrode) 106, a separator 112 interposed between the positive and negative electrodes, and an electrolyte 108 carrying lithium ions between the negative electrode and positive electrode and through the separator. Additional details of each of these elements are presented below. In commercial applications, all cell components are enclosed in a sealed case 102 with electrical leads or electronically conductive pathways 109a and 109b extending to the exterior of the case 102 for connecting to a power supply (for charging) and a load (during discharge). In some embodiments, portions of the case 102 may themselves serve as one or both electrical leads. For example, the bottom and side walls of the case may, together, serve as a positive terminal (effectively part of lead 109b), while a top cover, which is electrically insulated from the remainder of the case, may serve as a negative terminal (effectively part of negative lead 109a).

A complete cycle of a rechargeable lithium ion cell includes a charging phase and a discharging phase, sometimes referred to as charging and discharging half-cycles or, simply, charging and discharging cycles. During the charging phase, lithium ions are generated on the positive electrode 106 together with a corresponding number of electrons. Externally generated electrical potential forces the electrons to flow from the positive electrode 106 to the negative electrode 104 where they combine with lithium ions on the negative electrode active material to form lithium atoms. This process is sometimes referred to as lithiation (or intercalation, in certain embodiments). During the process, lithium ions are carried in the electrolyte 108 and through the separator 112, if one is present, and transferred to the negative electrode 104. Transferring lithium ions into a negative active material structure prevents formation of metallic lithium in the cell. In embodiments including silicon-based negative electrode, the resulting charged material has stoichiometry of $Li_{4.4X}Si$ where X is between, for example, about 0 and 1.0, with 1.0 representing a negative electrode material charged to its theoretical maximum capacity. A combined reaction for a lithium ion cell having the lithium cobalt oxide based positive electrode and the silicon based negative electrode is shown in the equation below where the left side of the equation represents the cell in the discharge state and the right side represents the charged state:

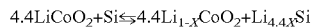

During the discharge cycle, the negative electrode active material loses electrons and releases lithium ions into the electrolyte where they are transported to the positive electrode. Thus, during discharge, electrons flow from the negative electrode 104 to the positive electrode 106 supplying power to external load 110. The charging and discharging phases may be repeated many times in rechargeable lithium ion cells. A typical cycle-life of a lithium ion cells may be in the hundreds or thousands of cycles, as dictated by the minimum allowable capacity of the cell.

Figure 2A:
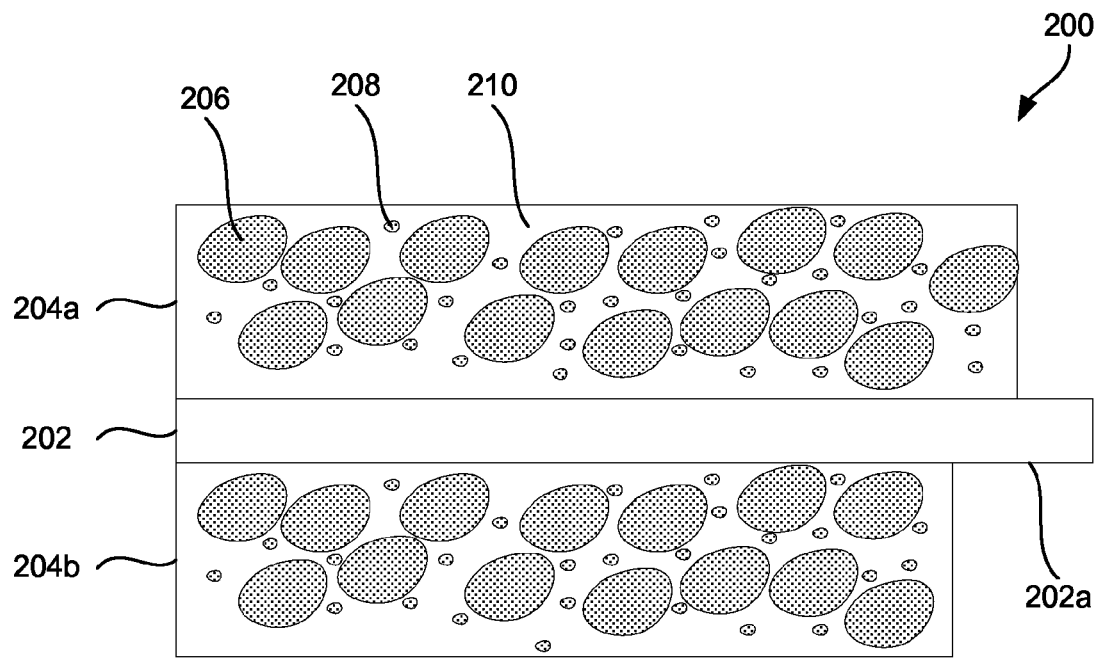
FIGS. 2A-B illustrate two examples of electrodes in accordance with certain embodiments.

An electrode typically includes a current collector (also referred to as a "substrate") and one or two active layers, which contain active materials. Examples of different electrodes are illustrated in FIGS. 2A-D. FIG. 2A illustrates a schematic cross-section representation of an example of an electrode 200 with a substrate 202 and two active layers 204a and 204b in accordance with certain embodiments. The active material 206 is dispersed through the active layers. The active layers 204a and 204b are typically provided on opposite sides of the substrate 202 with only a small portion of the current collector left exposed 202a in order to form an electrical connection with the electrode 200. In one embodiment, however, an electrode may have only one active layer (not shown); e.g., when the electrode serves as the first and the last electrode of a cell stack.

The active layers 204a and 204b may be deposited on the current collector 202 using a number of deposition techniques, such as doctor blading, slurry coating, pasting, and the like. The active layer may include one or more conductive additives 208 and a binder 210. The binder 210 is used to keep solid particle attached the surface of the current collector 202.

The active layers 204a and 204b typically, though not necessarily, have the same dimensions (at least length and width). In practice, the dimensions are driven by the specific application for the cell. In addition, positions of the active layers on the positive electrode usually coincide with the corresponding positions of active layers of the negative electrode.

Loadings of the active materials in the layers 204a and 204b are typically the same, but may vary within the processing tolerances (e.g., as dictated by deposition equipment capabilities). The thickness may be determined by the battery design and particularly capacity requirements. One factor is the charge and discharge rates, usually expressed as a ratio of either charge or discharge current relative to the cell capacity. For example, a rate of 1 C represents a current that completely discharges/drains a fully charged cell with 1 hour. The rate of 2 C corresponds to a double of the 1 C current, and so on. In high rate applications, such as those associated with hybrid electrical vehicles, cells are cycled at rates greater than 1 C, usually as high as 10 C. Such applications require that the electrode allow rapid intercalation of lithium ions into or deintercalation from active layers 204a and 204b and at the same time allow easy access of electrons from the current collector to the intercalation sites. Therefore, for high rate applications, relatively thinner active layers 204a and 204b and relatively thicker current collectors 202 are typically used in comparison with low and standard rate cells. Additionally, the amount of conductive additive 208 is usually increased to provide for higher electronic conductivity of the active layers 204a and 204b. As a result, less active material 206 is used per cell volume leading to a lower overall cell capacity. On the other hand, cells for low rate applications often contain more active materials and can therefore possess a higher energy density.

The width of the active layers 204a and 204b typically corresponds to the width (perpendicular to the cross-section illustrated in FIG. 2A) of the substrate 202. When assembled in a cell, the width of the positive electrode active area on the substrate is usually slightly smaller than that of the corresponding width of the negative electrode active area on its substrate. For example, the active parts of the negative electrode may extend between about 0.5-2.0 mm beyond the active parts of the positive electrode to ensure that all lithium ions released by the positive electrode during charge are intercalated into the negative electrode active material.

The current collector 202 is normally a thin metallic foil made of highly conductive, but electrochemically stable material. Aluminum foil is a common example for positive electrodes, while copper foil is common for negative electrodes. Other substrate materials may include stainless steel, titanium, nickel, molybdenum, platinum, iridium, carbon, and others. The selection usually depends on the active material and the intrinsic maximum potential of the electrode. The thickness of the current collector is typically chosen based on the intended capacity and charge/discharge rates of the cell as discussed above. For example, 20-30 μm thick aluminum foil may be used for cells designed to operate below 10 C currents. The substrate may be attached directly to the cell's corresponding electrical terminal or to some intermediate conducting structure, such as a current collection disk or tab. In one example, a case of the battery serves as the positive terminal.

Figure 2B:
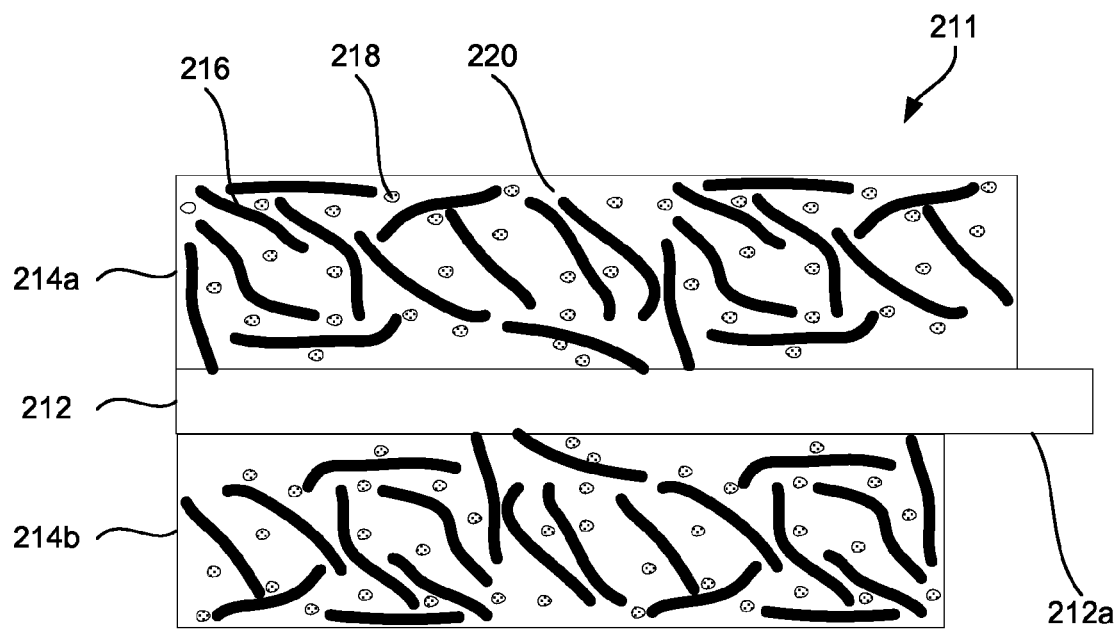

In certain embodiments, an electrode includes an open structure substrate, such as mesh, porous materials, foam-like structures, and others. In these embodiments, an active material layer may be dispersed throughout the entire thickness of the electrode instead of forming one or more layers as shown in FIGS. 2A-B. Various details and examples of the open structure substrates are described in U.S. patent application Ser. No. 12/437,529 filed on May 7, 2009 and U.S. patent application Ser. No. 61/260,292 filed concurrently herewith, which are incorporated by reference herein in their entirety for the purposes of describing open structure substrates.

The active material of the positive electrode may ne held on the substrate with a binder. In certain embodiments, the active material represents a bulk of positive electrode; for example about 60-95 weight percent of the active layer (i.e. excluding the substrate). Active materials are usually in the powder form with a mean particle diameter of between about 1 μm and 50 μm; more specifically, between about 3 and 30 μm. The selection of positive electrode materials depends on several considerations, such as cell capacity, safety requirements, intended cycle life, etc. A number of lithium containing compounds may be used. In a specific embodiment, the active material may be in the form of $LiMO_2$, where M is a metal e.g., $LiCoO_2$, $LiNiO_2$, and $LiMnO_2$. Lithium cobalt oxide ($LiCoO_2$) is a commonly used material for small cells but it is also one of the most expensive. The cobalt in $LiCoO_2$ may be partially substituted with Sn, Mg, Fe, Ti, Al, Zr, Cr, V, Ga, Zn, or Cu. Lithium nickel oxide ($LiNiO_2$) is less prone to thermal runaway than $LiCoO_2$, but is also expensive. Lithium manganese oxide ($LiMnO_2$) is the cheapest in the group of conventional materials and has relatively high power because its three-dimensional crystalline structure provides more surface area, thereby permitting more ion flux between the electrodes. Lithium iron phosphate ($LiFePO_4$) is also now used commercially as a positive electrode active material. Examples of the positive active materials include: Li$(M'_xM''_y)O_2$, where M' and M'' are different metals (e.g., Li$(Ni_xMn_y)O_2$, Li$(Ni_{1/2}Mn_{1/2})O_2$, Li$(Cr_xMn_{1-x})O_2$, Li$(Al_xMn_{1-x})O_2$), Li$(Co_xM_{1-x})O_2$, where M is a metal, (e.g. Li$(Co_xNi_{1-x})O_2$ and Li$(Co_xFe_{1-x})O_2$), Li$_{1-W}(Mn_xNi_yCo_z)$O$_2$, (e.g. Li$(Co_xMn_yNi_{(1-x-y)})O_2$, Li$(Mn_{1/3}Ni_{1/3}Co_{1/3})O_2$, Li$(Mn_{1/3}Ni_{1/3}Co_{1/3-x}Mg_x)$O2, Li$(Mn_{0.4}Ni_{0.4}Co_{0.2})O_2$, Li$(Mn_{0.1}Ni_{0.1}Co_{0.8})O_2$,) Li$_{1-W}(Mn_xNi_xCo_{1-2x})O_2$, Li$_{1-W}$(Mn$_x$Ni$_y$CoAl$_w$)O$_2$, Li$_{1-W}(Ni_xCo_yAl_z)O_2$ (e.g., Li$(Ni_{0.8}Co_{0.15}Al_{0.05})O_2$), Li$_{1-W}(Ni_xCo_yM_z)O_2$, where M is a metal, Li$_{1-W}(Ni_xMn_yM_z)O_2$, where M is a metal, Li$(Ni_{x-y}Mn_yCr_{2-x})O_4$, LiM'M''$_2$O$_4$, where M' and M'' are different metals (e.g., LiMn$_{2-y-z}$Ni$_y$O$_4$, LiMn$_{2-y-z}$Ni$_y$Li$_z$O$_4$, LiMn$_{1.5}$Ni$_{0.5}$O$_4$, LiNiCuO$_4$, LiMn$_{1-x}$Al$_x$O$_4$, LiNi$_{0.5}$Ti$_{0.5}$O$_4$, Li$_{1.05}$Al$_{0.1}$Mn$_{1.85}$O$_{4-z}$F$_z$, Li$_2$MnO$_3$) Li$_x$V$_y$O$_z$, e.g. LiV$_3$O$_8$, LiV$_2$O$_5$, and LiV$_6$O$_{13}$, LiMPO4 where M is a metal; lithium iron phosphate (LiFePO$_4$) is a common example. It is both inexpensive and has high stability and safety, because the relatively strong phosphate bonds tend to keep the oxygen in the lattice during overcharge, but has poor conductance and require substantial amounts of conductive additives, LiM$_x$M''$_{1-x}$PO$_4$ where M' and M'' are different metals (e.g-.LiFePO$_4$), LiFe$_x$M$_{1-x}$PO$_4$, where M is a metal, LiVOPO$_4$ Li$_3$V$_2$(PO$_4$)$_3$, LiMPO$_4$, where M is a metal such as iron or vanadium. Further, a positive electrode may include a secondary active material to improve charge and discharge capacity, such as V$_6$O$_{13}$, V$_2$O$_5$, V$_3$O$_8$, MoO$_3$, TiS$_2$, WO$_2$, MoO$_2$, and RuO$_2$.

Various examples of negative electrode materials and corresponding processing methods are described in U.S. patent application Ser. No. 12/437,529 filed on May 7, 2009 and U.S. Provisional Patent Application No. 61/181,637 filed on May 27, 2009, which are incorporated by reference herein in their entirety for the purposes of describing negative electrode materials and corresponding processing methods.

FIG. 2B illustrates an example of an electrode 211 with two active layers 214a and 214b that include an active material 216 in the form of nanowires. Certain details pertaining to nanowires are described in U.S. patent application Ser. No. 12/437,529 filed on May 7, 2009, which is incorporated by reference herein in its entirety for the purposes of describing nanowires. Similar to the electrode presented in FIG. 2A, the electrode 211 may include a substrate 212, a conductive additive 218, a binder 220, and exposed part of the substrate 212a for establishing electrical connection to cell terminals.

Many active materials are insufficiently conductive (electrically) by themselves to support high power applications. Therefore, a conductive additive may be used in construction of the positive electrode. Essentially any electro-conductive material that is chemically and electrochemically stable may be used in positive and negative electrodes. In some cases, the conductive additive is a carbonaceous material, such as coke, acetylene black, carbon black, Ketchen black, channel black, furnace black, lamp black and thermal black or carbon fibers, graphite in an amount up to 20 weight percent of the active layer, more specifically 1 to 10 weight percent. Additionally, conductive additives may comprise metallic flakes or particles of copper, stainless steel, nickel or other relatively inert metals, conductive metal oxides, such as titanium oxides or ruthenium oxides, or electronically-conductive polymers, such as polyaniline or polypyrrole. In one specific embodiment, the conductive material is a carbon black having a mean particle size of between 1 μm and 70 μm, more specifically between about 5 μm and 30 μm, is used in an amount of between about 1 and 5 weight percent of the total positive electrode active layer. Conductive additives particles may have surface area on the order of about 100 m$^2$/g or less. Higher amounts of conductive agent may be needed in certain designs such as those for high rate applications and those involving relatively thick electrodes.

Certain details pertaining to conductive additives and dopants that may be incorporated directly into active material structures (instead of binder as described above) are described in U.S. patent application Ser. No. 12/437,529 filed on May 7, 2009, which is incorporated by reference herein in its entirety for the purposes of describing conductive additives and dopants.

A binder is used to hold the active material and the conductive agent on the substrate. Generally, a binder may be used in the amount of between about 2 and 25 weight percent of the active layer based on the solid content of the binder (i.e. excluding solvent). Binders may be soluble in aqueous or non-aqueous solvents, which are used during fabrication. Some examples of "non-aqueous binders" include poly(tetrafluoroethylene) (PTFE), poly(vinylidene fluoride) (PVDF), styrene-butadiene copolymer (SBR), acrylonitrile-butadiene copolymer (NBR) or carboxymethyl cellulose (CMC), polyacrylic, and polyethylene oxide, and combinations thereof. For example, 10-20 weight percent PVDF dissolved in N-methyl-2-pyrrolidinone (NMP) may be used. As another example, a combination binder using 1-10 weight percent of polytetrafluoroethylene (PTFE) and 1-15 weight percent of carboxymethylcpllulose (CMC) may be used relative to the total weight of the materials in the layer.

Examples of "aqueous binders" include carboxymethyl cellulose and poly (acrylic acid), and/or acrylonitrile-butadiene copolymer latex. One specific example of an aqueous binder is polyacrylamide in combination with at least one of the following copolymers: carboxylated styrene-butadiene copolymer and styrene-acrylate copolymer. The ratio of polyacrylamide to such copolymer may be between about 0.2:1 to about 1:1 on a dry weight basis. In another specific example, the aqueous binder may comprise a carboxylic acid ester monomer and a methacrylonitrile monomer.

In another specific example, the binder may include a fluoropolymer and a metal chelate compound. The fluoropolymer may be polymerized from fluorinated monomers, such as vinyl fluoride (VF), vinylidene fluoride (VdF), tetrafluoroethylene (TFE), trifluoroethylene (TrFE), chlorotrifluoroethylene (CTFE), fluorinated vinyl ethers, fluorinated alkyl acrylates/methacrylates, perfluoroolefins having 3-10 carbon atoms, perfluoro C1-C8 alkyl ethylenes and fluorinated dioxoles. The metal chelate compound may be in the form of a heterocyclic ring with an electron-pair-acceptor metal ion, such as titanium and zirconium ions, attached by coordinate bonds to at least two electron-pair-donor nonmetal ions, such as N, O, and S.

Figure 2C:
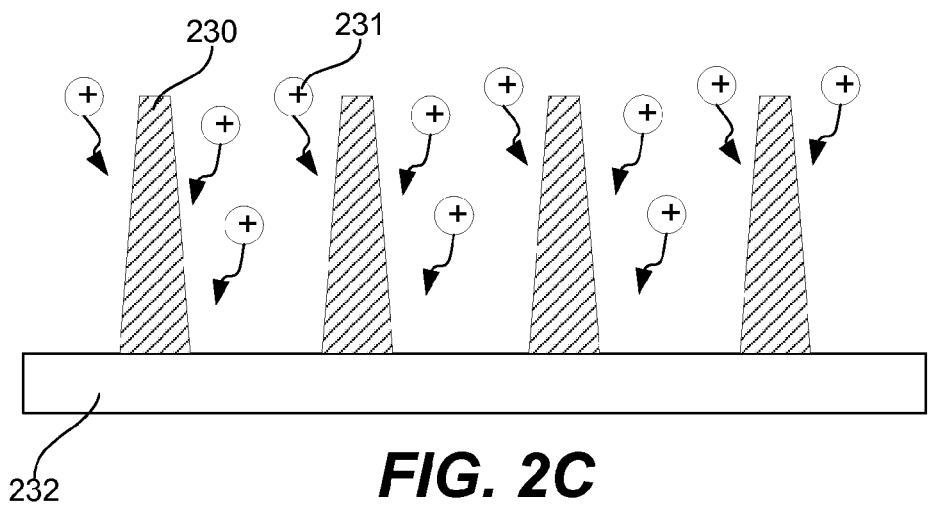
FIGS. 2C-D illustrate an example of an electrode active layer with active materials arranged into substrate rooted nanowires; the electrode example is shown in a relative charge and discharge states in accordance with certain embodiments.
Figure 2D:
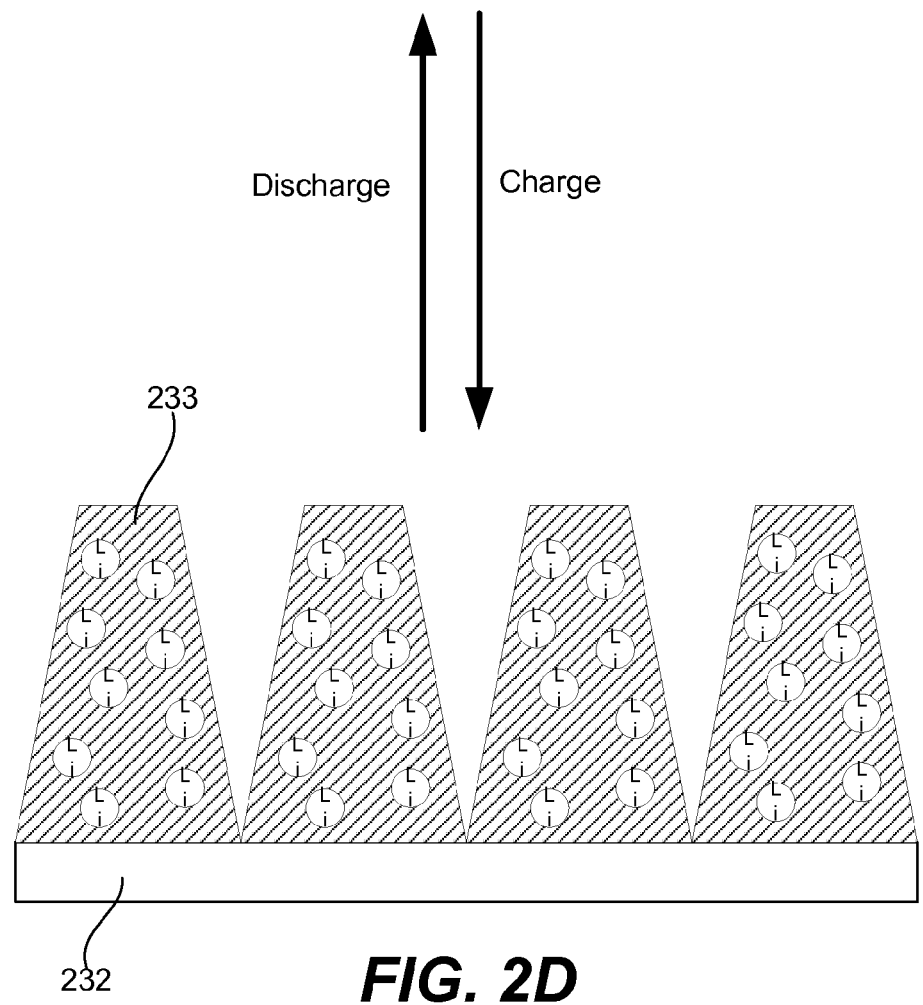

FIG. 2C illustrates a negative electrode example that includes nanostructures 230 in contact with a substrate 232. The nanostructures 230 contain active material for insertion/ removal of lithium ions 231 during charging/discharging. The nanostructures form an active layer over the substrate 232. In certain negative electrode embodiments, insertion of active ions 231 into nanostructures transforms the discharged nanostructures 230 shown in FIG. 2C into the charged nanostructures 233 shown in FIG. 2D. Note that active ions are typically receive electrons and are converted into charged equivalents of the active ions. For example, in lithium ions cells, lithium ions are converted to lithium atoms in the negative electrode during lithiation. In a similar manner, the removal of lithium ions 231 from the charged nanostructures 233 transforms them into the discharge nanostructures 230. Generally, materials increase in size, i.e., swell, due to insertion of other materials into original structures whether though intercalations, alloying, chemical reactions, or any other method of insertion. Materials having high capacities, i.e., capable of accepting many ions per unit mass or volume, tend to exhibit more swelling. One of the challenges in electrode design is to allow for this swelling without substantial destruction of the electrode structure and losses of cell performance.

Swelling and shrinking of nanostructures as illustrated in FIGS. 2A-B can fracture the nanostructures especially when cycling is performed at high rates. Without being restricted to any particular theory, it is believed that when silicon nanostructures are initially charged (and swollen as a result) and then held at that state for a prolonged period of time, stress levels initially generated in the structure during the charge slowly decrease during the rest period. The "relaxed" structures seem to have better cycle life, which may be due to stress levels not reaching the fracture limit in the subsequent cycles.

Figure 3:
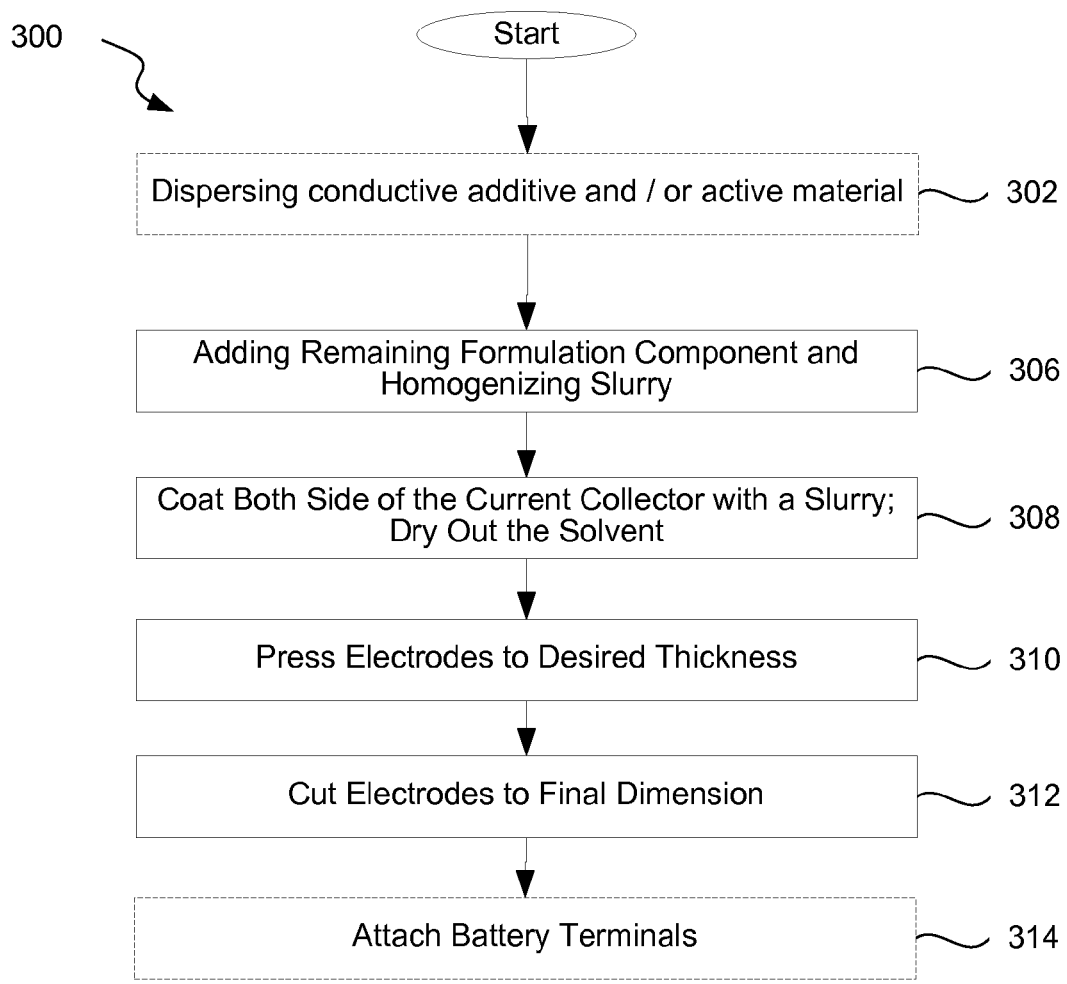
FIG. 3 is a process flowchart for fabrication an electrochemical cell in accordance with certain embodiments.

FIG. 3 presents a general process 300 of fabricating electrodes using a polymeric binder to attach the active material to the substrate in accordance with certain embodiments. Other electrode fabrication methods may not require polymeric binder. For example, silicon nanowires may be growth-rooted directly on the substrate (or an intermediate layer) as, for example, described in U.S. patent application Ser. No. 12/437,529 filed on May 7, 2009 and U.S. patent application Ser. No. 61/260,297 filed concurrently herewith, which are incorporated by reference herein in its entirety for the purposes of describing various electrode fabrication methods. Other methods may include Chemical Vapor Deposition of an amorphous silicon layer onto the substrate (typically a high surface area substrate). In yet other examples, electrodes may be prepared using electrospinning as described in U.S. Provisional Patent Application No. 61/183,529 filed on Jun. 2, 2009, which is incorporated by reference herein in its entirety for the purposes of describing electrode fabrications methods.

The process 300 starts with preparation of slurry that is later coated on a substrate (see blocks 302-306). Generally, the slurry contains all materials of the positive active layer (e.g., positive electro-active materials, binders, and conductive additives) and a solvent. The solvent may be chosen to achieve a desired viscosity during the deposition process. The conductive agent may require a separate dispersion operation, which would usually be performed by pre-mixing some binder and a conductive agent and then passing the resulting mixture through a dispersing system, such as a ball mill or a high-shear mixer (see block 302). In certain embodiments, the operation takes hours and the slurry may be periodically tested using a Hegman gauge to determine presence of un-dispersed conductive agent particles. Depending on the thickness of active layer, the maximum particle requirement may be set to between about 10 μm and 100 μm. Large particles may interfere with slurry deposition process and affect uniformity of electrical properties.

The remaining components (typically the active material and possibly some additional solvent) are then added into the slurry (see block 306.) The formulation of the slurry excluding the solvent (i.e. the solid content) at this point is usually representative of the resulting active layer. Typically the viscosity of the slurry is adjusted by adding solvent suitable for use with the deposition system. For many processes, a slurry viscosity of 5,000-40,000 cP is appropriate. When the desired viscosity is reached, the slurry is coated onto the current collector material and the solvent is removed by drying (see block 308). A typical weight density of the dry positive active layer may be between about 0.001 g/cm$^2$ and 0.030 g/cm$^2$, more preferably between about 0.005 g/cm$^2$ and 0.010 g/cm$^2$, excluding substrate. For example, an electrode with two active layers each having a density of 0.020 g/cm$^2$ coated on a 30 μm aluminum substrate would have a total electrode density of about 0.048 g/cm$^2$.

Figure 4:
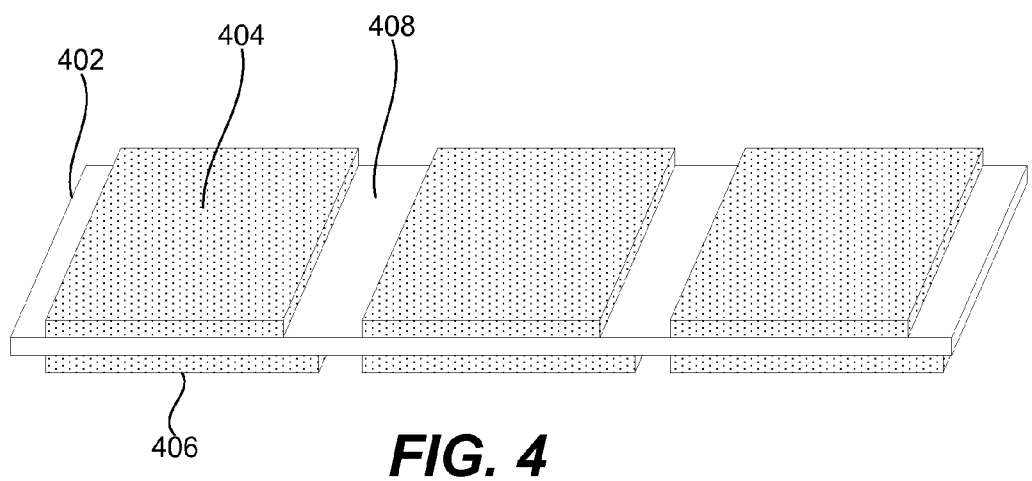
FIG. 4 illustrates an example of a continuous substrate with patches of active layer deposited on both sides of the substrate in accordance with certain embodiments.

Coating may be performed using a moving web comprising a current collector as shown in FIG. 4. For example, a web of aluminum foil having thickness of 10-30 μm and a width of between about 10 cm and 500 cm may be used. The web 402 may be patch coated on both sides 404 and 406, each patch may be representative of the final electrode length. The uncoated gap 408 between the plates may be used for attachment of battery terminals. Alternatively, a continuous coating may be applied on both or one side of the web.

Returning to FIG. 3, the coated and dry plates are usually compressed to achieve a desired density of the active layer (see block 310). The compressing may be done using a set of rollers configured to keep a certain pressure or provide a certain gap. The rollers may be heated to between about 60 and 120 degrees Centigrade. Moreover, the coated plates may be pre-heated to between about 60 and 120 degrees Centigrade making the active material layer more susceptible to uniform compression. The positive electrodes are usually compacted to a total thickness of between about 50 μm and 300 μm, including both active layers and a current collector. Typically, the porosity of compressed electrode is between about 20 and 50%, more specifically between about 30 and 40%. Finally, the compressed plates are cut to the electrodes of the required width and length (see block 312). Battery terminals may be attached to the current collector either before or after the cutting (see block 314).

In certain embodiments, a positive electrode and/or a negative electrode may include active materials in the form of nanostructures. Examples of positive electrode nano-structured active materials include various lithium metal oxides (e.g., $LiCoO_2$, $LiFePO_4$, $LiMnO_2$, $LiNiO_2$, $LiMn_2O_4$, $LiCoPO_4$, $LiNi_{1/3}Co_{1/3}Mn_{1/3}O_2$, $LiNi_xCo_yAl_zO2$, $LiFe_2(SO4)_3$), carbon fluoride, metal fluoride, metal oxide, sulfur, and combination thereof. Doped and non-stoichiometric variations of these materials may be used as well.

In certain embodiments, the nano-structured active material is substrate rooted. The term "substrate-rooted" is used herein to describe nanostructures, such as nanowires, that are physically and conductively attached to a substrate, which may serve as a current collector for an electrode. The nanostructures may be rooted to the substrate at random locations on the structure's profiles (randomly rooted) or rooted preferentially at some particular location on the nanostructures (non-randomly rooted). Examples of non-randomly rooted nanostructures include terminally rooted nanostructures and medially rooted nanostructures. Terminally rooted nanostructures are preferentially affixed to the substrate at a terminal or distal end of the structures. This assumes that the nanostructures have (in general) some principal dimension that is longer than other dimensions of the structures. As explained below, many different nanostructures are contemplated, many of which will have terminuses or ends (and therefore be capable of terminal rooting). Prominent examples include nanowires and nanorods, which may have aspect ratios greater than one, or more specifically, greater than four.

Medially rooted nanostructures are preferentially affixed to the substrate at medial position (rather than a terminal position) on the nanostructures' profiles. Non-randomly rooted nanostructures need not have all the nanostructures or even nearly all of the nanostructures affixed to the substrate at the same relative location (e.g., a terminus or a particular medial position). However, they will on average have a higher fraction of the nanostructures rooted to the substrate at this particular location than would be accomplished if the nanostructures were attached to the substrate in a purely random fashion. On the other hand, non-rooted nanostructures will on average have a higher fraction of the nanostructures that are not rooted to the substrate. For example, nanostructures may be mixed with a binder to form slurry that is coated to the substrate. Most typically, a higher fraction of the nanostructure will not be in direct contact with or rooted to the substrate.

The unconnected or free ends of non-randomly rooted nanostructures may be aligned in a common direction (e.g., aligned nanostructures) or may be randomly aligned (e.g., random terminally rooted nanostructures). For example, aligned terminally rooted nanowires may be aligned in a common direction with respect to the substrate, such as orthogonally to the substrate surface at the point of attachment. Alternatively, the aligned terminally rooted nanowires may be aligned generally at an angle of 30 degrees from the normal, 45 degrees from the normal, and other angles (not shown). Many other non-random orientations are possible; e.g., curved or zig-zagged.

Various examples of substrate rooted nanostructures, core-shell arrangements, and corresponding processing methods are described in U.S. patent application Ser. No. 12/437,529 filed on May 7, 2009, which is incorporated by reference herein in its entirety for the purposes of describing substrate rooted nanostructures and corresponding processing methods. Further, certain core-shell arrangements and corresponding processes are described in U.S. Provisional Patent Application No. 61/181,637 filed on May 27, 2009, which is incorporated by reference herein in its entirety for the purposes of describing core-shell arrangements and corresponding processes.

In some cell designs, the overall negative electrode structure and composition may be similar to that of the positive electrode. Of course, the electrochemically active materials generally will be different. In certain embodiments, the negative electrode active material includes a binder, a conductivity enhancing agent, and an electrochemically active material. In some embodiments, however, little if any conductive additives are added to silicon based lithium intercalation materials. Copper is a common material for current collectors. However, copper may be electrolytically dissolved during deep discharges, so other materials, such as titanium and nickel may be more suitable in certain applications. Usually, the thicknesses of the current collectors of the negative electrode and positive electrode are matched based on their respective conductivities.

In certain embodiments, the negative electrode active material is preloaded with lithium prior to formation cycling and, typically, before assembling the negative electrode into the battery. For example, the negative electrode may be preloaded with between about 5% and 15% lithium based on its capacity relative to the capacity of the negative electrode. Further details pertaining to such embodiments are presented in U.S. patent application Ser. No. 61/260,294 filed concurrently, which is incorporated herein by reference.

The electrolyte in lithium ions cells may be liquid, solid, or gel. The lithium ion cells with the solid electrolyte also referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

A liquid electrolyte lithium ion cell typically includes a separator positioned as a sheet between the positive and negative electrodes. A separator is a membrane that both physically and electrically separates the two electrodes, thereby preventing the electrodes from shorting while lithium ions pass between the two electrodes. A separator should generally be ionically conductive and electronically insulating. A separator may also provide one or more aspects of thermal management in the cell; such as by increasing in ionic resistivity at higher temperatures and thereby preventing thermal runaways. A separator is made of electrically insulative materials that are also chemically stable and insoluble in the electrolyte. A separator typically has porosity sufficient to allow flow of the electrolyte through it during the electrochemical reaction of the cell, which is measured in percentages or Gurley unit ratings, i.e. a number of seconds required for 100 cubic centimeters of air to pass through 1.0 square inch of a given material at a given pressure differential, usually 2.3 cm Hg.

In one embodiment, a separator material may include a fabric woven from fluoro-polymeric fibers of polyethylenetetrafluoroethylene (PETFE) and polyethylenechlorotrifluoroethylene used either by itself or laminated with a fluoropolymeric microporous film. Moreover, a separator materials may include, polystyrenes, polyvinyl chlorides polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, a polypropylene membrane commercially available under the designation CELGARD from Celanese Plastic Company, Inc. in Charlotte, N.C., USA, as well as Asahi Chemical Industry Co. in Tokyo, Japan, Tonen Corporation, in Tokyo, Japan, Ube Industries in Tokyo, Japan, and Nitto Denko K.K. in Osaka, Japan. In one embodiment, a separator includes copolymers of any of the foregoing, and mixtures thereof.

A typical membrane has the following characteristic: air resistance (Gurley number) of less than about 800 seconds, or less than about 500 seconds in a more specific embodiment; thickness of between about 5 µm and 500 µm, or in specific embodiment between about 10 µm and 100 µm, or more specifically between about 10 µm and 30 µm; pore diameters ranging from between about 0.01 µm and 5 µm or more specifically between about 0.02 µm and 0.5 µm; porosity ranging from between about 20% and 85%, or more specifically, between about 30% and 60%.

Two common arrangements of the electrodes in lithium ion cells are wound and stacked. One goal is to position and align the surfaces of active layers of the two electrodes surfaces as close as possible without causing an electrical short. Close positioning allows lithium ions to travel more rapidly and more directly between the two electrodes leading to better performance.

Figure 5A:
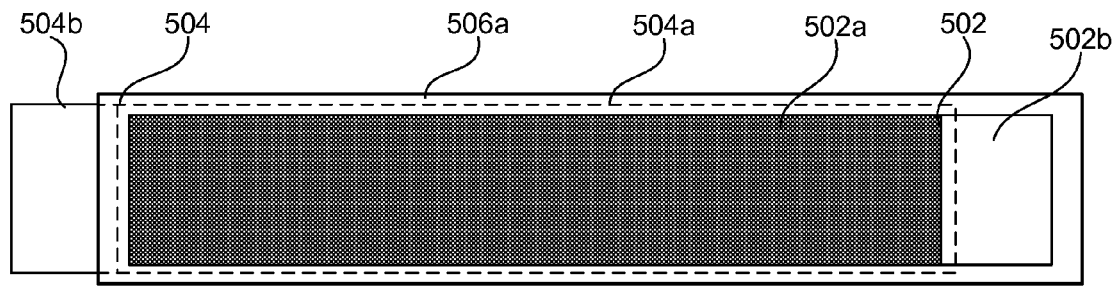
FIGS. 5A-B is a top schematic view and a side schematic view of an illustrative electrode arrangement in accordance with certain embodiments.

FIG. 5A illustrates a side view of an aligned stack including a positive electrode 502, a negative electrode 504, and two sheets 506*a* of the separator in accordance with certain embodiments. The positive electrode 502 may have a positive active layer 502*a* and a positive uncoated substrate portion 502*b*. Similarly, the negative electrode 504 may have a negative active layer 504*a* and a negative uncoated substrate portion 504*b*. In many embodiments, the exposed area of the negative active layer 504*a* is slightly larger that the exposed area of the positive active layer 502*a* to ensure trapping of the lithium ions released from the positive active layer 502*a* by intercalation material of the negative active layer 504*a*. In one embodiment, the negative active layer 504*a* extends at least between about 0.25 and 5 mm beyond the positive active layer 502*a* in one or more directions (typically all directions). In a more specific embodiment, the negative layer extends beyond the positive layer by between about 1 and 2 mm in one or more directions. In certain embodiments, the edges of the separator sheets 506*a* extend beyond the outer edges of at least the negative active layer 504*a* to provide electronic insulation of the electrode from the other battery components. The positive uncoated portion 502*b* may be used for connecting to the positive terminal and may extend beyond negative electrode 504 and/or the separator sheets 506*a*. Likewise, the negative uncoated portion 504*b* may be used for connecting to the negative terminal and may extend beyond positive electrode 502 and/or the separator sheets 506*a*.

Figure 5B:
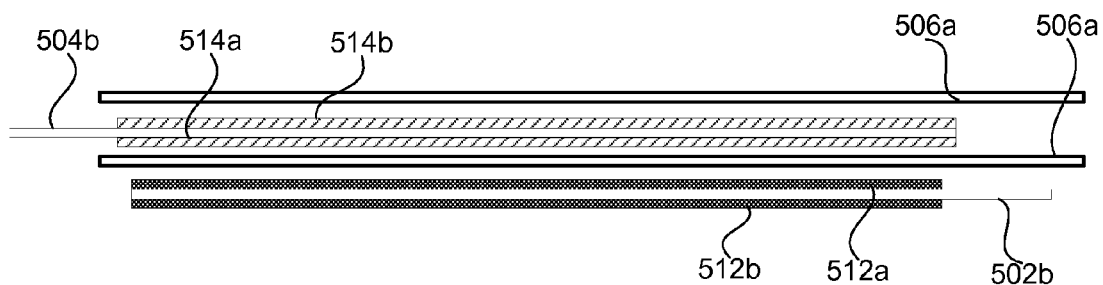

FIG. 5B illustrates a top view of the aligned stack. The positive electrode 502 is shown with two positive active layers 512*a* and 512*b* on opposite sides of the flat positive current collector 502*b*. Similarly, the negative electrode 504 is shown with two negative active layer 514*a* and 514*b* on opposite sides of the flat negative current collector. Any gaps between the positive active layer 512*a*, its corresponding separator sheet 506*a*, and the corresponding negative active layer 514*a* are usually minimal to non-existent, especially after the first cycle of the cell. The electrodes and the separators are either tightly would together in a jelly roll or are positioned in a stack that is then inserted into a tight case. The electrodes and the separator tend to swell inside the case after the electrolyte is introduced and the first cycles remove any gaps or dry areas as lithium ions cycle the two electrodes and through the separator.

Figure 6A:
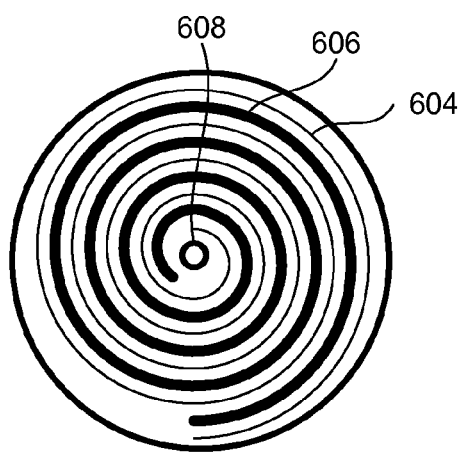
FIGS. 6A-B is a top schematic view and a perspective schematic view of an illustrative round wound cell in accordance with certain embodiments.
Figure 6B:
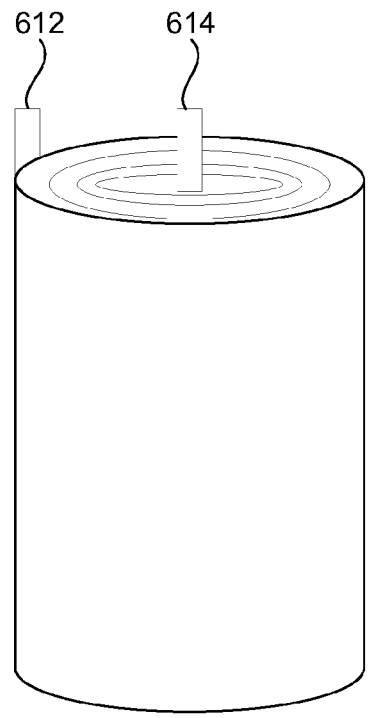

A wound design is a common arrangement. Long and narrow electrodes are wound together with two sheets of separator into a sub-assembly, sometimes referred to as a jellyroll, shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and thicknesses of active layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets negative effecting lithium ion transport between the electrodes. Nevertheless, in certain applications, such as those dictated by rectangular form factors, prismatic cells are appropriate. In some embodiments, prismatic cells employ stacks rectangular electrodes and separator sheets to avoid some of the difficulties encountered with wound prismatic cells.

Figure 7:
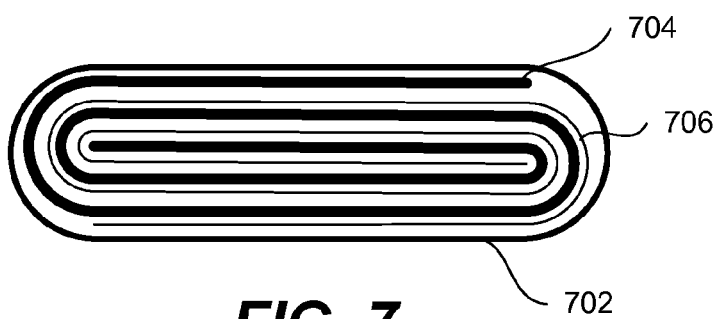
FIG. 7 is a top schematic view of an illustrative prismatic wound cell in accordance with certain embodiments.

FIG. 7 illustrates a top view of a wound prismatic jellyroll. The jelly roll comprises a positive electrode 704 and a negative electrode 706. The white space between the electrodes is representative of the separator sheets. The jelly roll is inserted into a rectangular prismatic case 702. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
FIGS. 8A-B is a top schematic view and a perspective schematic view of an illustrative stack of electrodes and separator sheets in accordance with certain embodiments.
Figure 8B:
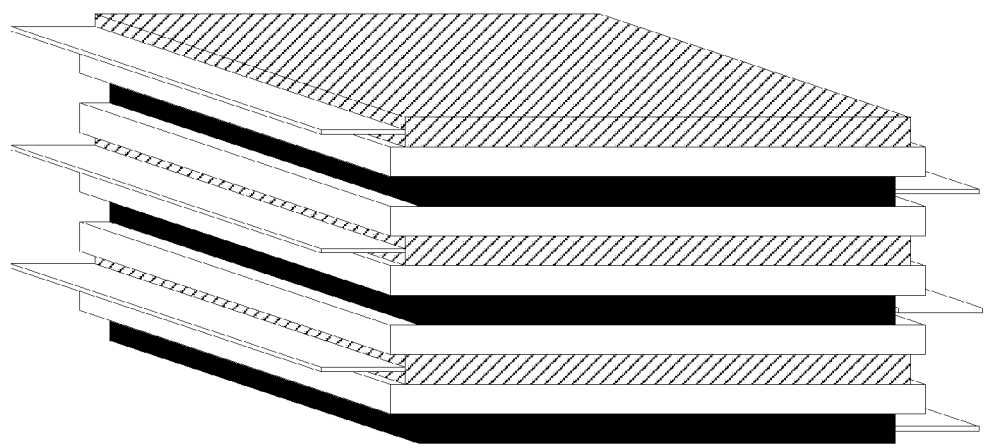

FIG. 8A illustrates a side view of a stacked cell including a plurality of sets (801*a*, 801*b*, and 801*c*) of alternating positive and negative electrodes and a separator in between the electrodes. One advantage of a stacked cell is that its stack can be made to almost any shape, and is particularly suitable for prismatic cells. However, such cell typically requires multiple sets of positive and negative electrodes and a more complicated alignment of the electrodes. The current collector tabs typically extend from each electrode and connected to an overall current collector leading to the cell terminal.

Figure 9:
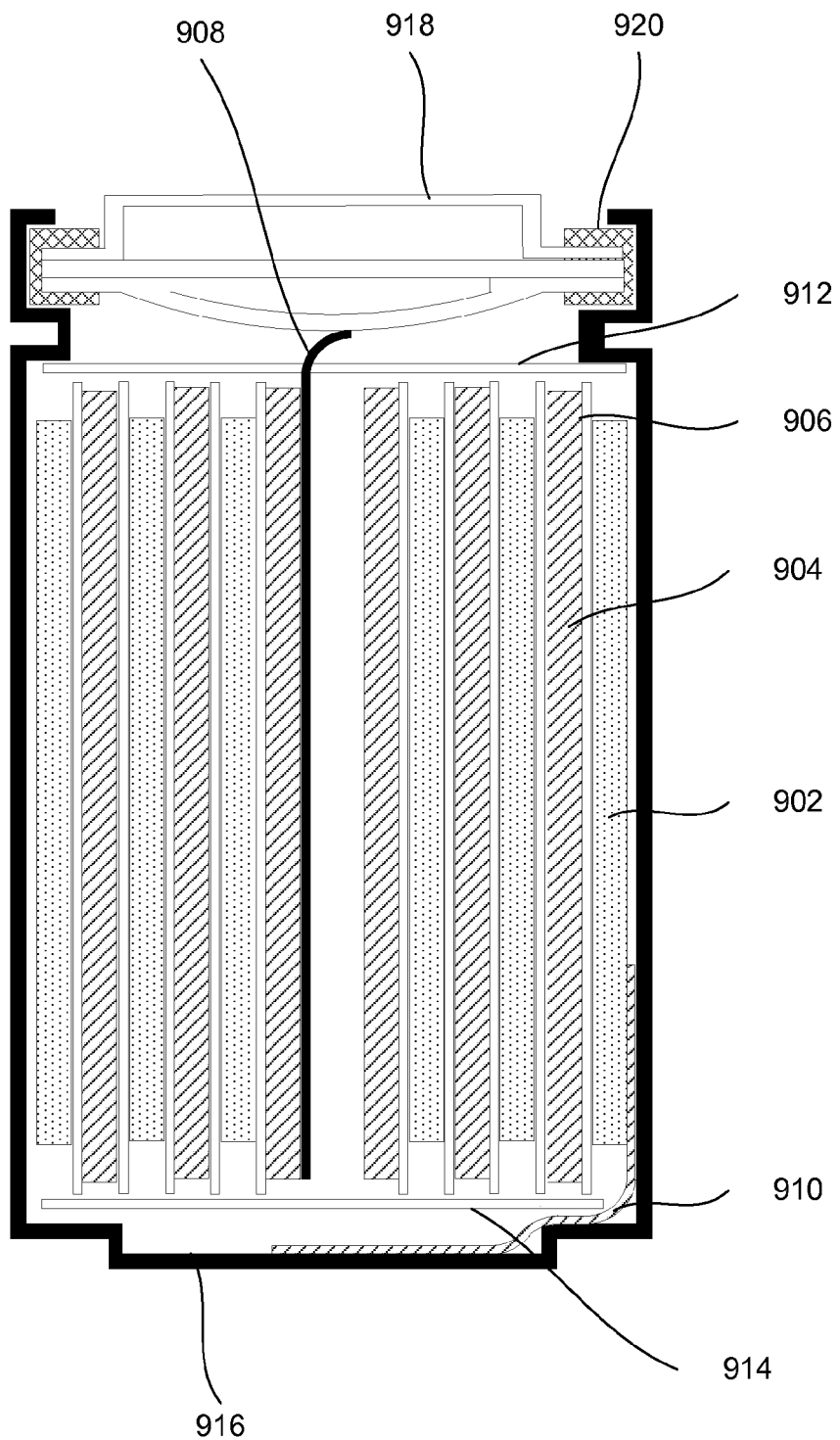
FIG. 9 is a schematic cross-section view of an example of a wound cell in accordance with embodiments.

FIG. 9 illustrates a cross-section view of the wound cylindrical cell in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. In some cases, cap 918 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In certain embodiments, a disclosed method of preparing a lithium ion cell, may be characterized by the following operations: (a) receiving a negative electrode containing a negative electrode electrochemically active material for releasing lithium ions during discharge of the lithium ion cell; (b) receiving a positive electrode containing a positive electrode electrochemically active material for taking up the lithium ions during discharge of the lithium ion cell; (c) receiving a separator for electronically isolating the negative electrode and the positive electrode in the lithium ion cell and allowing for the lithium ions to transfer between the negative electrode and positive electrode; (d) preparing the lithium ion cell by arranging the positive electrode, the negative electrode, and the separator together with an electrolyte for transporting lithium ions between the positive electrode and the negative electrode during cycling of the lithium ion cell; and (e) forming the lithium ion cell. Certain details of operations (a)-(d) have already been described above. Further, preparing the lithium ion cell is sometimes referred to as assembling the cell. Operation (e) is described below in the context of FIG. 10 and FIGS. 11A-11C.

Figure 10:
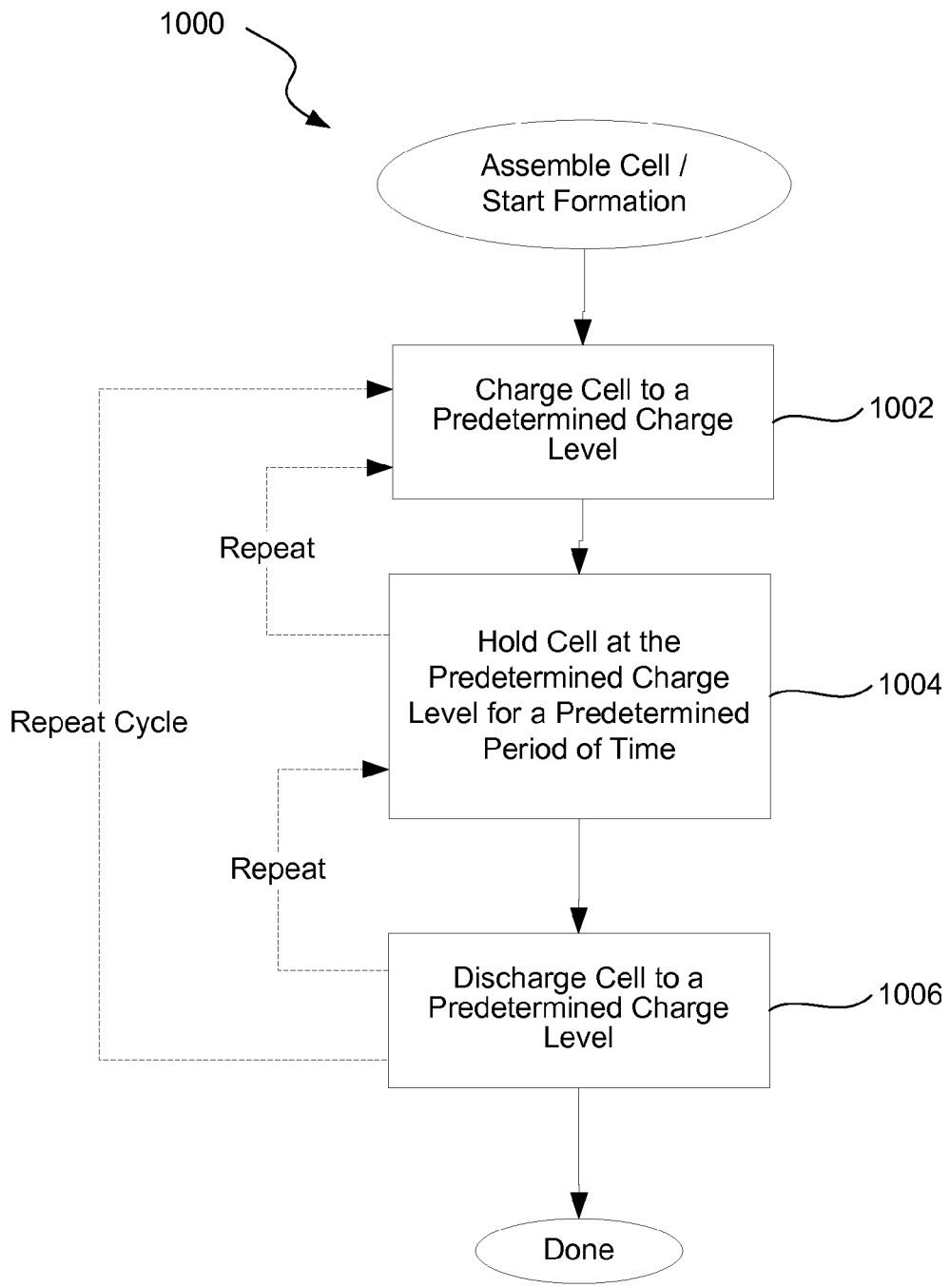
FIG. 10 is a generalized process flowchart for performing one or more formation cycles on an electrochemical cell in accordance with certain embodiments.

FIG. 10 illustrates a process flowchart for forming a lithium ion cell in accordance with certain embodiments. The process 1000 is typically performed after preparing (or assembling) the cell in operation (d) and before any electrochemical cycling is performed. In certain embodiments, the process 1000 is performed before a cell is completely sealed, which may facilitate releasing gases formed inside the cell during formation, such as byproducts of SEI layer formation and gases released from void spaces inside the electrodes (e.g., in between substrate rooted nanowires) during electrode wetting, which may continue into formation and long after electrolyte filling.

The process 1000 may start with charging an assembled cell to a predetermined charge level (operation 1002). This charge level may be determined by the capacity of the negative electrode active material (as determined by, e.g., composition, structure, fractional density, active layer thickness), target performance characteristics of the cell (e.g., cycle depths (cut off voltages), charge and discharge rates, total capacity, cycle life parameters), and other parameters. The charge level may be expressed as a ratio to the theoretical capacity of the negative electrode active material. In certain embodiments, the predetermined charge level is at least about 5% of the theoretical capacity of the negative electrode active material, or more specifically at least about 10% or at least about 25% of that capacity. In even more specific embodiments, the predetermined charge level is set to at least about 50% of the theoretical capacity of the negative electrode active material, or more specifically at least about 60%, at least about 70%, at least about 80%, at least about 90%, at least about 95%, or at least about 98%. For example, a predetermined charge level for cells with silicon based negative electrodes may be at least about 3900 mAh per gram of silicon or, more specifically, at least about 4000 mAh per gram of silicon or even at least about 4100 mAh per gram of silicon. In other embodiments, a predetermined charge level used in operation 1002 is expressed as a ratio to a target highest operating capacity of the negative electrode active material. For example, a cell with one or more silicon based negative electrodes may be designed to cycle between about 1000 mAh/g and 2000 mAh/g even though its available capacity may be much higher. A predetermined charge level may be at least about 50% of the target highest operating capacity of the negative electrode active material, or more specifically at least about 60%, at least about 70%, at least about 80%, at least about 90%, at least about 95%, or at least about 98%

In certain embodiments, the lower cut-off voltage for a half-cell is at least about 10 mV, or more specifically at least about 70 mV, or at least about 100 mV, or at least about 170 mV (with respect to a lithium metal electrode). In the same or other embodiments, the upper cut-off voltage is at least about 0.5V, or more specifically at least about 0.7 V, or even more specifically at least about 0.9 V. The values for full-cell configurations can be determined based on the configurations and values presented above.

Figure 11A:
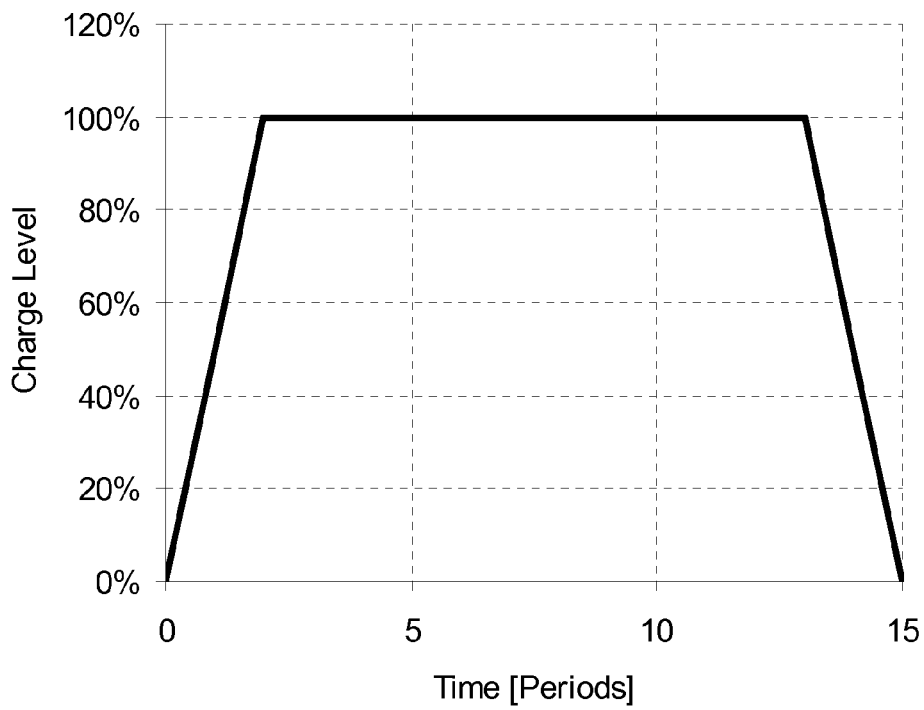
FIGS. 11A-D are plots of charging capacities as functions of time that represent various formation cycle profiles in accordance with certain embodiments.
Figure 11B:
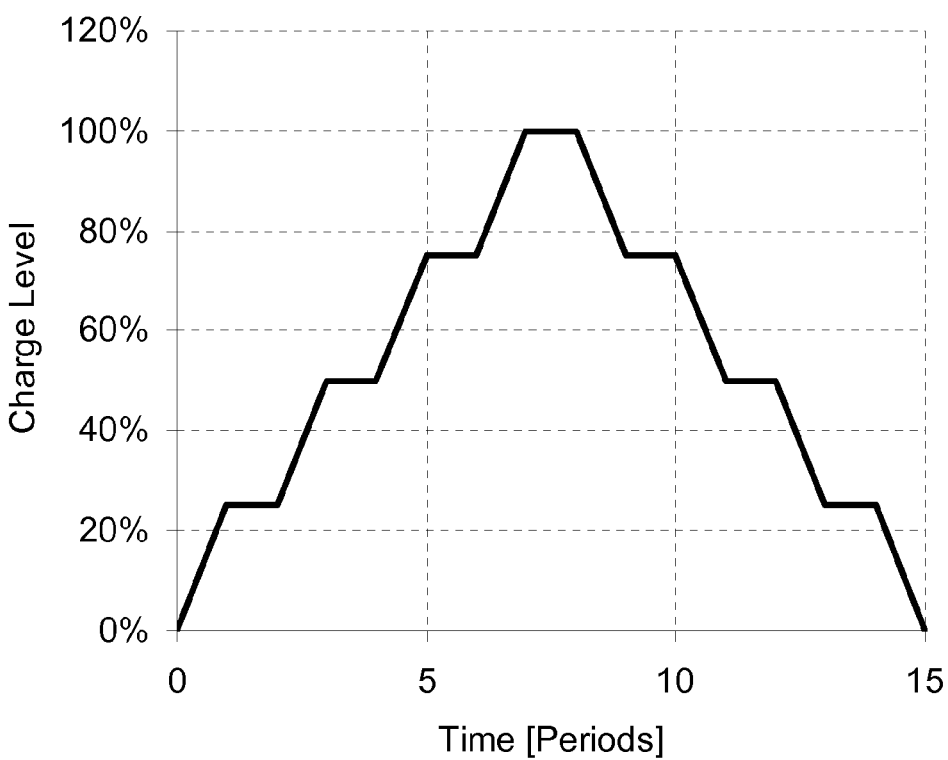
Figure 11C:
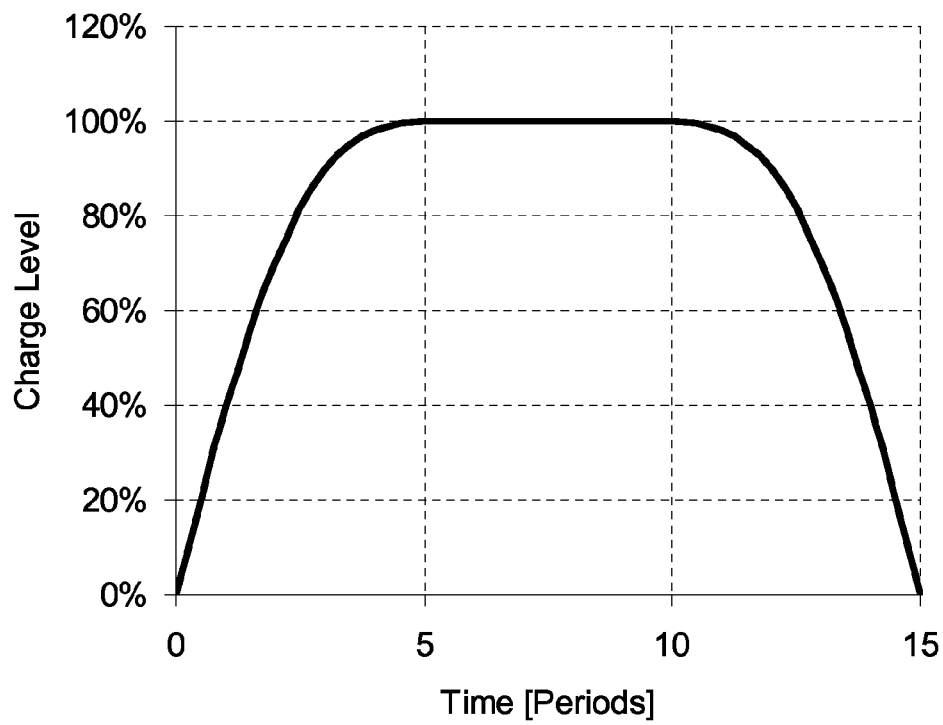

Charging the cell in operation 1002 may be performed at various charge rates (electrical currents), e.g., less than about C, less than about C/2, less than about C/4, less than about C/10, less than about C/20, or less than about C/40. The charge rate may be constant throughout operation 1002 as, for example, illustrated in FIG. 11A. The charge rate may also vary during operation 1002. The rate may be higher initially and then gradually (or in a stepwise fashion) decreased as the cell approaches the predetermined charge level. A specific embodiment of charging a cell with a variable charging rate is illustrated in FIG. 11C. In certain embodiments, charge and/or discharge rates may be about C/5, about C/10, about C/20, about C/30, and about C/50.

Once the cell is charged to the predetermined charge level in operation 1002, the depicted process 1000 proceeds to the next operation which involves holding the cell at that state (without external charging or discharging, at least in certain embodiments) for a predetermined period of time (operation 1004) before proceeding to any other operations. It should be understood that holding the cell in the charged state means that no external loading is applied to the cell. The cell may loose some of its charge during operation 1004, for example, due to internal shorts, SEI layer formation, and other reasons. The cell may be kept in the charged state for at least about 1 hours or, more specifically, at least about 2 hours, at least about 4 hours, at least about 8 hours, at least about 16 hours, at least about 24 hours, at least about 48 hrs, at least about 96 hrs, at least about 7 days, at least about 14 days, or at least about 30 days.

The process 1000 then proceeds to an operation 1006 where the cell is discharged to a predetermined discharge level. Alternatively, the process 1000 may include one or more additional repetitions of operations 1002 and 1004 before proceeding to operation 1006. One such embodiment is illustrated in FIG. 11B. The cell may be incrementally charged to between about 1% and about 50% of the total capacity in each repetition and held to between about 15 minutes and about 14 days after each repetition before further charging. For example, the cell may be charged to about 10% of the theoretical capacity and then held at that state for between about 10 minutes and 24 hours. Then the cell may be further charged to about 20% and again held at the new state for a predetermined period time as so on (i.e., 30%, 40%, etc.). Individual charge levels, charging rate profiles, holding duration, and other parameters may be different from one repetition to another.

In operation 1006, the cell is discharged to a predetermined discharge level. The discharge level may be determined based on the charge level and possibly other factors such as all or some of the factors specified above for charge levels. Examples of other factors include active negative electrode material composition, structure, fractional density, active layer thickness, targeted performance characteristics of the cell (e.g., cycle depths, charge and discharge rates), etc. Similar to the charge level described above, the discharge level may be expressed as a ratio to the theoretical capacity of the negative electrode active material. In certain embodiments, the predetermined charge level is at least less than about 50% of the theoretical capacity of the negative active material or, more specifically, at least less than about 40%, at least less than about 30%, at least less than about 20%, or at least less than about 10%.

Discharging the cell in operation 1006 may be performed at various discharge rates, e.g., at least less than about C, less than about C/2, less than about C/4, less than about C/10, less than about C/20, or less than about C/40. The discharge rate may be constant throughout operation 1006 as, for example, illustrated in FIG. 11A. Alternatively, the discharge rate may be variable during operation 1006. The discharging rate may be lower initially and then gradually (or in a stepwise fashion) increased as the cell approaching the predetermined discharge level. A specific embodiment of discharging a cell with a variable discharging rate is illustrated in FIG. 11C.

In certain embodiments, the process 1000 repeats the discharging and holding procedure one or more times after operation 1004. One such embodiment is illustrated in FIG. 11B. The cell may be incrementally discharged to between about 1% and about 50% of the total capacity in each repetition and held at that state to between about 15 minutes and about 14 days in each repetition before proceeding to the next repetition. Discharge levels, discharging rate profiles, holding duration, and other parameters may be different from one repetition to another.

Figure 11D:
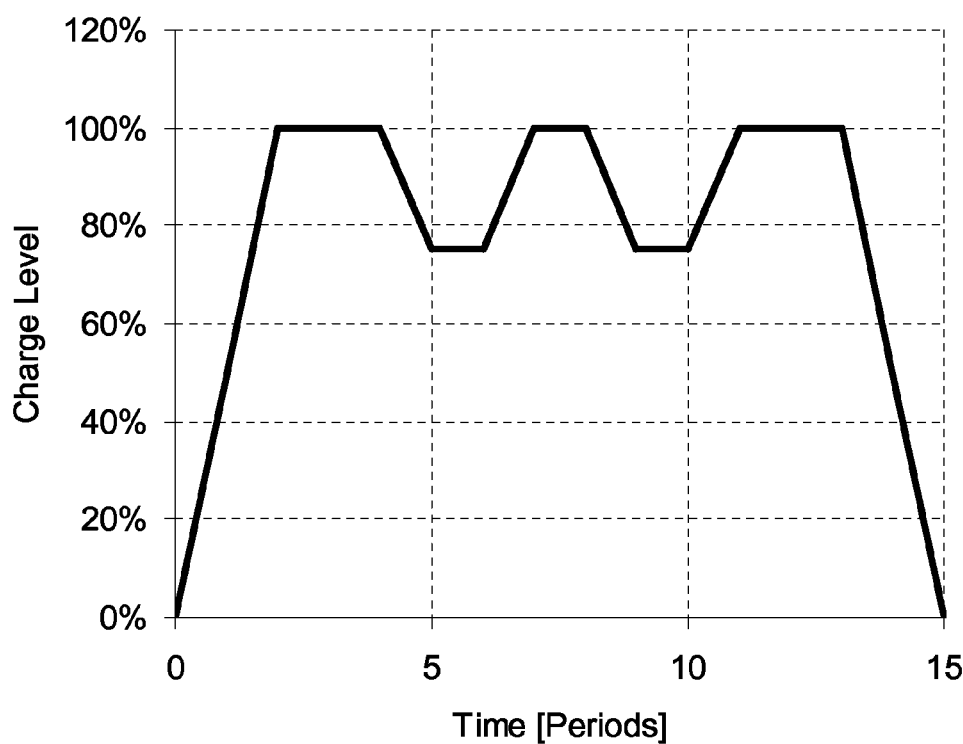

In certain embodiments, the process 1000 involves repeating operations 1002, 1004, and 1006 at least once. One such embodiment is illustrated in FIG. 11D. It should be noted that process parameters for each of the operations in individual formation cycles may be different. For example, a cell may be charged to at least 90% of the theoretical capacity of the negative active material and then held for at least about 24 hours in that state. The process may follow by a series of short and "shallow" (i.e., substantially less than a full discharge) discharge-rest-charge-rest cycles before proceeding to the final discharge operation.

A specific example of formation process was tested in an experiment conducted using silicon-based lithium ions cells. Negative electrodes of these cells included silicon nanowires growth rooted on a stainless steel substrate, positive electrodes made of lithium foil, and electrolytes composed of 1.0 M LiPF6 EC: DEC. Both the control and test cells were charged at C/20 to about 4100-4200 mAh/g based on the amount of silicon available on each negative electrode. It should be noted that all capacity values presented in this section are based on the corresponding amount of silicon on the negative electrode, unless otherwise noted. The control cells were then discharged at C/20 within 1-2 hours after the charging. The test cells were kept at a charged stated (i.e., without applying any external load) for 48 hours before being discharged at the same rate. Both sets of cells were then cycled at least one more time at C/20 rate. The charge and discharge capacities for the first and the second cycles are presented in the table below.

TABLE 2

| | Test Cells (48 hrs delay) | Control Cells |
|---|---|---|
| 1st Charge [mAh/g] | 4092 | 4277 |
| 1st Discharge [mAh/g] | 3720 | 3124 |
| 1st Coulomb. Eff. [%] | 90.9% | 73.0% |
| 2nd Charge [mAh/g] | 3500 | 3541 |
| 2nd Discharge [mAh/g] | 3408 | 3193 |
| 2nd Coulomb. Eff. [%] | 97.4% | 90.2% |

The experimental results indicate that the test cells had Coulombic efficiencies (a Coulombic efficiency is defined as a ratio of a discharge capacity to a previous charge capacity) substantially higher in both cycles than the controlled cells. This data indicates that no only the test cells have lower capacity looses in the initial formation cycle but also these cells were expected to have better cycle life.

Capacity losses may also be described from the perspective of lithium retained on the negative electrodes during cycling. The tests cells had more lithium ions removed from the silicon nanowires during the discharge phase of the two cycles than the control cells. The gap continued to widen during the second cycle.

Another experiment was conducted in which a group of cells with silicon-based negative electrodes and metallic lithium positive electrodes were charged at C/20 rate to 100 mV. At this point, the voltage was held constant at 100 mV until the charge current dropped to C/1000. This group of cells then rested (with an open circuit) for 24 hours and was then discharged at C/20 to 700 mV. An average charge capacity under both the constant current and constant voltage charging regimes was 2900 mAh/g for 65 cells that went through the test, which resulted in an average first cycle columbic efficiency of 84.6% (with the highest individual cell value of t 89.6% and the lowest value of 77.4%). When these cells were cycles further they demonstrated more stable cycling and longer cycle-lives when compared to the cells that went through conventional (faster) formation cycling or cycling without a rest period after charging.

Other experiments were conducted to demonstrate the high first cycle coulombic efficiencies resulting from the present invention. In one experiment, six cells were charged at C/20 rate to 10 mV and then immediately discharged (without any rest or taper) at about the same rate to 1 V. Upon reaching 1 V the cells were then discharged at a constant voltage until the current tapered to C/500. The cells demonstrated an average charge capacity of 3028 mAh/g-Si and an average discharge capacity of 2775 mAh/g-Si during the first cycle resulting in an average coulombic efficiency of 91.6% (the maximum value for the coulombic efficiency among these cells was 94.0%).

A second cycle was conducted with these six cells to improve cycle efficiency was conducted as follows: three cells were charged at C/20 to 10 mV, then rested at open circuit for 24 hrs, then discharged at C/20 to 1 V. The mean charge, discharge, and efficiency for these cells were 3450 mAh/g-Si, 3205 mAh/g-Si, and 91.8%, respectively. To maximize first cycle efficiency, one may discharge the negative electrodes as much as possible, and thus reduce the irreversibility of the cycle.

Some inventive conditions for maximizing coulombic efficiency of the first cycle follow. In one example, a cell may be discharged to a relatively high voltage (e.g., between about 1.0 and 1.5V) than in conventional formation cycles (e.g., about 0.7V) and/or the rest period after initial charging may be avoided to ensure a start of a discharge at as low a voltage as possible. It has been found that a cell's voltage increases while the cell is resting at open circuit after charging. Other process conditions may include resting a cell after charging to, e.g., allow active material structures to relax after lithiation and before discharge. In certain embodiments, the rest period may be between about 12 hours and 48 hours. Generally, longer rest periods allow more relaxation. However, it has been found that cells, which were rested for several days, showed substantial voltage drop after that relaxation period, some of which resulted in irreversible capacity losses. The current may be also tapered at a constant voltage following the discharge in an attempt to reach a thermo-chemical equilibrium at that constant voltage. The discharge rate at the end of such tapering period can be set to between about C/50 and about C/1000, or less than about C/1000 in some embodiments. Generally, smaller discharge rate at the end of the tapering period results in a higher discharge capacity. However, at certain discharge rates, which depend on a cell design, further lowering discharge rates results in insignificant improvements.

Another experiment was conducted to comparing four slightly different formation cycle profiles and their effects on the first cycle columbic efficiency and the cycle life. All four formation cycles were performed at about C/20 charging current to about 100 mV and then discharged to about 700 mV. The cycles differed in following ways at end to the charging period. In the first formation cycle profile, the voltage was held at 100 mV to allow for current to taper to about C/100. The charging followed by the 24 hour rest period. In the second formation cycle profile, the voltage was hold at 100 mV such that the total charging time was about 36 hours. This profile also included a 24 hour rest period at the end of the charging. In the third formation cycle profile, no current tapering was performed during charging, but the cells were rested for about 24 hours after charging. Finally, in the fourth formation cycle profile, no current tapering was performed, but the voltage was held for about 36 hours. Cells subjected to the fourth formation cycle profile showed the highest columbic efficiency of about 80.0% on average. Cells subjected to the third formation cycle profile showed the lowest columbic efficiency (about 77.4% on average). Considering the small difference among four profiles and the number of cells subjected to each profile, it was believed that the difference may not be statistically significant.

In this experiment, a more noticeable difference appeared in the cycle life of the formed cell. Cells subjected to the second formation cycle profile cycled much more stably and had a longer life than the cells subjected to other profiles. This experiment makes it evident that even small difference in formation cycle profiles can significantly impact of cell performance.

In general, a constant current, constant voltage (CCCV) formation cycle can be expressed in a series of the following steps. First, a cell is charged at a rate of $X_1$ (e.g., C/5, C/10, C/20, C/50) to a voltage of $Y_1$ (e.g., 160 mV, 120 mV, 100 mV, 60 mV, 10 mV) This charge may be followed with a constant voltage taper until the current reaches a value of $Z_1$ (e.g., C/50, C/100, C/1,000, C/10,000). The cell may be then rested for a period R (e.g., 0 hours, 12 hours, 24 hours, 48 hours, 72 hours), followed by a discharge at a current $X_2$ (e.g., C/5, C/10, C/20, C/50) to a voltage $Y_2$ (e.g., 500 mV, 600 mV, 700 mV, 1 V, 1.5 V) The discharge may be followed by a constant voltage taper to a current $Z_2$ (e.g., C/50, C/100, C/1,000, C/10,000).

In certain embodiments, which could be combined with other embodiments described in this document, the cell temperature varies during the formation process. Without being restricted to any particular theory, it is believed that increasing the temperature could increase the reaction rate and quickly form an SEI layer. On the flip side, it is believed that decreasing the temperature could retard the SEI formation. Therefore, controlling the temperature may allow initiate and control formation of an SEI layer relative to other processes. For example, a silicon-based negative electrode may be initially lithiated at a low temperature (i.e., perform the initial cell charge at low temperature), such that very little, if any, of the SEI layer is formed. The negative active material structure may be then allowed to relax during the rest period that follows the charge. For example, charging and/or resting may be performed at a temperate of less than about 25° C. or more specifically less than about 10° C., or less than about 0° C. The cell temperature may be then increased and the cell is discharged. This temperature control may allow shifting a substantial portion of the SEI layer formation from the charging phase to the discharge phase of the formation cycle, such that the SEI layer is formed on the negative material structures that have been expanded (e.g., lithiated) and, in some embodiments, relaxed. It is believed that such temperature control helps to minimize SEI layer damage during initial charging and negative active material swelling by limiting SEI layer formation until after the swelling has occurred.

Although the foregoing invention has been described in some detail for purposes of clarity of understanding, it will be apparent that certain changes and modifications may be practiced within the scope of the appended claims. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. A method of preparing a lithium ion cell, the method comprising:
   (a) receiving a negative electrode comprising silicon as a negative electrode electrochemically active material for releasing lithium ions during discharge of the lithium ion cell;
   (b) receiving a positive electrode containing a positive electrode electrochemically active material for taking up lithium ions during discharge of the lithium ion cell;
   (c) receiving a separator for electronically isolating the negative electrode and the positive electrode in the lithium ion cell;
   (d) preparing the lithium ion cell by arranging the positive electrode, the negative electrode, and the separator together with an electrolyte for transporting lithium ions between the positive electrode and the negative electrode during cycling of the lithium ion cell; and
   (e) forming the lithium ion cell by
      (i) charging the lithium ion cell to at least about 20% of the theoretical capacity of the negative electrode electrochemically active material,
      (ii) holding the lithium ion cell in a charged state for at least about 0.5 hours, and
      (iii) discharging the lithium ion cell, whereby holding the lithium ion cell in the charged state in (ii) provides improved Coulombic efficiency in one or more subsequent cycles.

2. The method of claim 1, wherein the negative electrode electrochemically active material further comprises at least one material selected from the group consisting of germanium, carbon, and tin.

3. The method of claim 1, wherein the negative electrode electrochemically active material is preloaded with lithium.

4. The method of claim 3, wherein the amount of lithium in the preloaded negative electrode electrochemically active material corresponds to at least about 5% of the theoretical capacity of the negative electrode electrochemically active material.

5. The method of claim 1, wherein charging the lithium ion cell in (e) comprises charging the negative electrode electrochemically active material at a rate of between about C/10 to about C/40.

6. The method of claim 1, wherein charging the lithium ion cell in (e) comprises charging to between about 20% and about 100% of the theoretical capacity of the negative electrode electrochemically active material.

7. The method of claim 1, wherein holding the lithium ion cell in (e) comprises holding said cell in the charged state for at least about 1 hour.

8. The method of claim 1, wherein a discharge capacity of lithium ion cell after 10 cycles measured at a rate of about C/2 is at least about 50% of the theoretical capacity of the negative electrode electrochemically active material.

9. The method of claim 1, wherein holding the lithium ion cell in (e) comprises holding said cell in the charged state for between about 1 and 72 hours.

10. The method of claim 1, wherein holding the lithium ion cell in (e) comprises discharging said cell at a rate of no greater than about C/50.

11. The method of claim 1, wherein discharging the lithium ion cell in (e) comprises discharging the lithium ion cell to a state where the Coulombic efficiency of the first charge cycle is at least about 80%.

12. The method of claim 1, wherein discharging the lithium ion cell in (e) comprises discharging the lithium ion cell to a state where the Coulombic efficiency of the first charge cycle is at least about 70%.

13. The method of claim 1, wherein the negative electrode electrochemically active material comprises silicon and wherein discharging the lithium ion cell in (e) comprises discharging the lithium ion cell to a state where the silicon releases lithium corresponding to the silicon capacity of at least about 3,000 mAh/g.

14. The method of claim 1, wherein in a first charge-discharge cycle after formation, the lithium ion cell exhibits a Coulombic efficiency of at least than about 95%.

15. The method of claim 1, wherein the negative electrochemically active material comprises a nanostructured silicon material.

16. The method of claim 1, wherein the negative electrochemically active material comprises substrate rooted silicon nanowires.

* * * * *